Feb. 28, 1956 P. SPENCE 2,736,212
ADJUSTABLE LEVER VALVE
Filed April 24, 1953 2 Sheets-Sheet 1

INVENTOR.
PAULSEN SPENCE
BY Mitchell & Bechert
ATTORNEYS

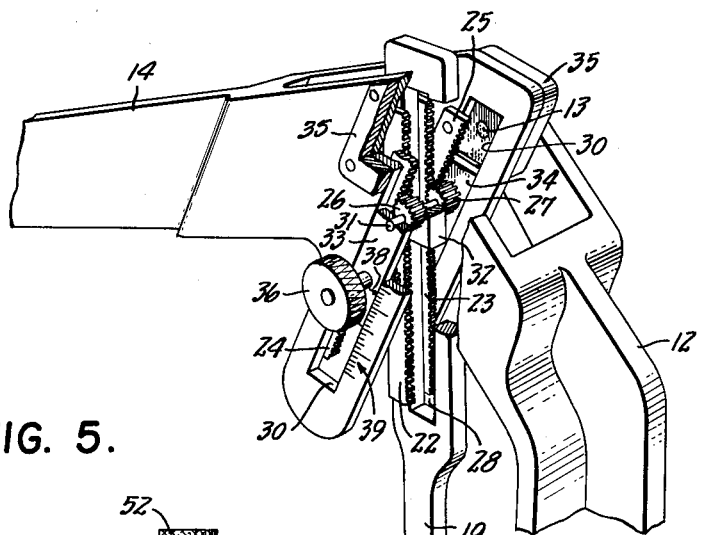
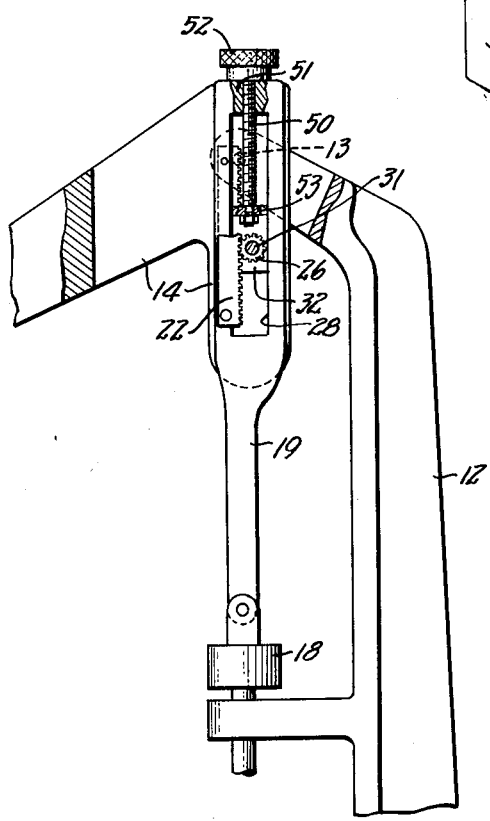
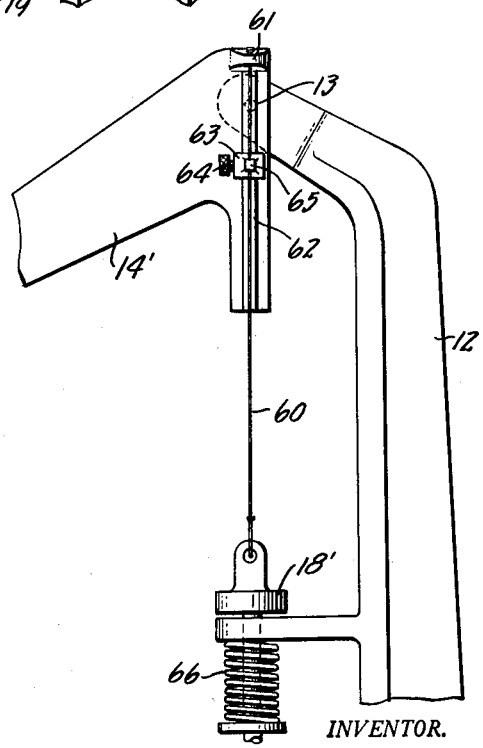

United States Patent Office 2,736,212
Patented Feb. 28, 1956

2,736,212

ADJUSTABLE LEVER VALVE

Paulsen Spence, Baton Rouge, La.

Application April 24, 1953, Serial No. 350,970

18 Claims. (Cl. 74—522)

My invention relates to a lever-actuated valve, and in particular to mechanism connecting the lever in a characterized actuating relation with the valve.

In many lever-controlled applications, it is desirable to provide adjustment for the total travel of the valve member, while maintaining the same available total actuating movement of the lever. It is also desirable that whatever the total travel selected for the valve member, the initial movement of the lever shall be accompanied by relatively small valve-opening movements, while later movements of the actuating lever are accompanied by rather large valve-opening displacements. Finally, it is desirable that, whatever the selected total travel for the valve member, there shall be no need to adjust the length of the valve stem in order that one extreme position of the lever shall always bring the valve member to closed position. To my knowledge, no prior-art construction has incorporated all these important features.

It is, accordingly, an object of the invention to provide an improved valve-actuating linkage of the character indicated.

It is a specific object to provide a linkage meeting all the above-indicated desirable features; in other words, it is an object to provide a linkage in which a single adjustment may provide selection of the total valve travel for a given total lever movement, without disturbing the zero or closed position of the valve member, and providing the indicated non-linear relationship, at least near the valve-closed position.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 3 is a fragmentary view in perspective, with a few parts broken away, and illustrating the linkage of Fig. 1 in an actuated position;

Figs. 5 and 6 are views similar to Fig. 1, but illustrating modifications of the invention.

Briefly stated, my invention contemplates an improved linkage connecting an actuating lever to a valve stem, for adjustably determining the total lift available for a given total actuation of the lever, and for achieving this adjustment without requiring separate valve-stem positioning adjustment and while maintaining at all times a predominantly non-linear relationship between lever movement and valve-stem lift, particularly near the valve-closed position. The mechanism provides for adjustable placement of a pivotal connection between the lever and a connecting link (which link may be a rod or a cable connecting the lever to the valve stem), and this adjustment is made along an axis that is generally aligned with the valve-stem axis when the valve member is at the zero or closed position. The adjustable connection is such that, whatever the selected placement of the pivot, the total effective length of the connecting link plus the instantaneous cranking radius of the pivot (i. e. with respect to the pivotal axis of the lever) remains a constant; thus, once the parts are connected to return the valve member to closed position for one extreme actuation of the lever, this relationship will hold true whatever the adjustment of the pivot.

In one form to be described, elongated racks are provided as part of the actuating lever and as part of the connecting rod of the valve stem. These racks overlap and are generally aligned with the valve-stem axis when in the position corresponding to valve-closed position, and pinion means mesh in common with both racks. Various means may be provided for adjustably placing the pinion means along the racks in order to determine a selected effective cranking radius about the lever pivot. In another form to be described, a cable of fixed length connects the valve stem to a cranking point or pivot on the lever, said point being substantially aligned with the lever pivot and with the valve-stem axis when in the valve-closed position; for adjustably determining the cranking radius, the connection point or pivot may be guided along the lever and may be slidable with respect to the cable.

Figure 1:
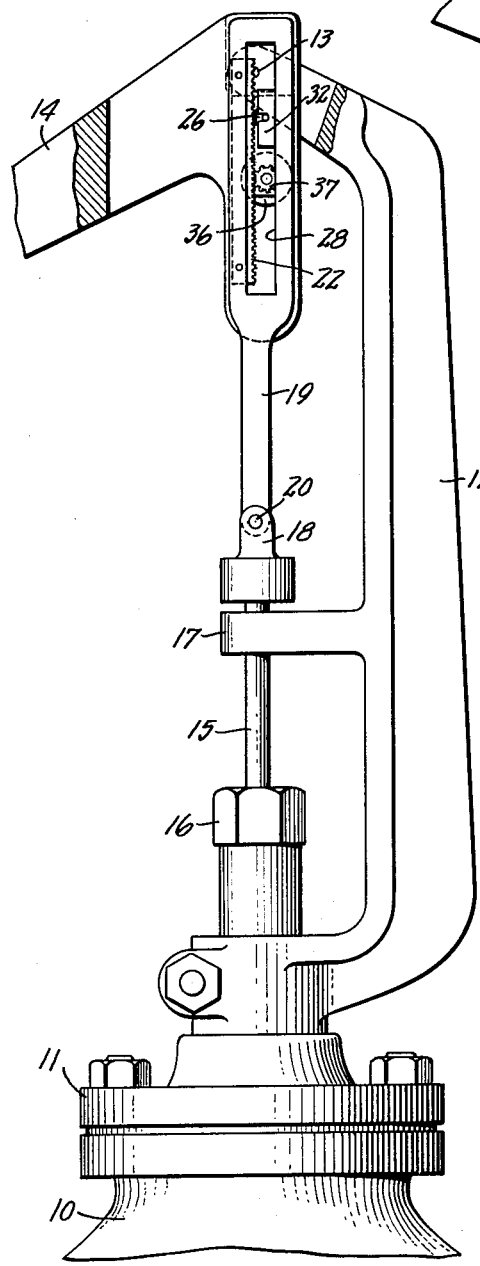
Fig. 1 is a fragmentary view in elevation, and partly in section, illustrating a valve-actuating mechanism incorporating features of the invention.
Figure 2:
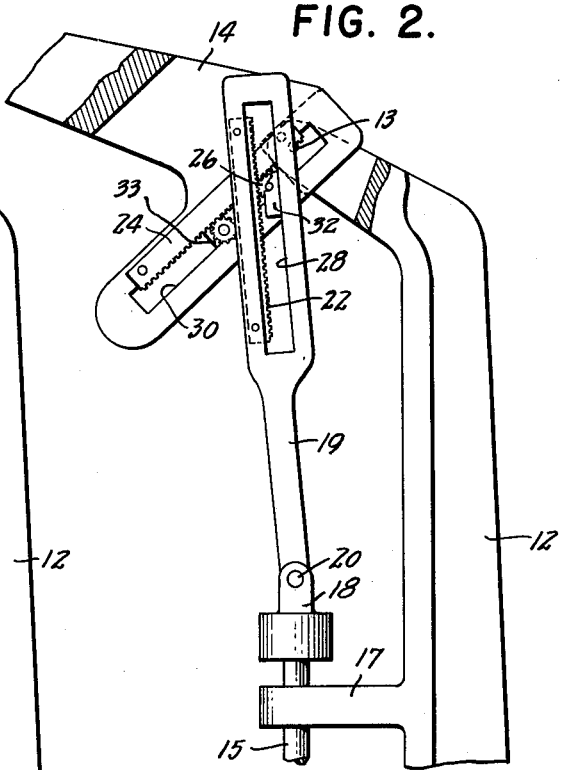
Fig. 2 is a fragmentary view of the parts of Fig. 1, but with the lever in a raised position.

Referring to Figs. 1 to 3, my invention is shown in application to a valve having a body 10 and with a bonnet 11 supporting upstanding frame means 12 for establishing the pivot axis 13 for an actuating lever 14. The valve may include a valve member (not shown) connected to valve-stem means 15 guided by means 16—17 along the valve-stem guide axis and including at the outer exposed end valve-stem connecting means 18 for connection to an actuating mechanism to be described.

In the forms of Figs. 1 to 3, the basic connection between the lever 14 and the valve-stem connecting means 18 is established by a single connecting rod or the like 19 pivotally connected at its lower end by means 20 to the valve-stem connecting means 18. Adjustable pivot means connect the other end of the link 19 to the lever 14, and in the form shown the adjustable pivot comprises pinion means held in constant mesh with separate racks which respectively form part of the connecting rod or link 19 and of the lever 14. In Fig. 2, rack means 22 will be seen to be fixed to the link 19, and rack means 24 will be seen to be fixed to the lever 14; and in Fig. 1 both of these rack means appear overlapped, in that extreme position of lever 14 which corresponds to the valve-closed position of the valve-stem connecting means 18. When overlapped, that is, in the valve-closed position, the rack axes or pitch lines are preferably aligned with the valve-stem guide axis, as shown in Fig. 1. As indicated generally above, the sole connection between the two rack means 22—24 is established by pinion means 26, and means to be described position and hold the pinion means in desired relation with these two rack means.

The basic parts of my mechanism have already been identified, but for the purpose of symmetrically applying forces (so as to make for easy adjustment and trouble-free operation), I show in Fig. 3 certain duplicate employments of the described parts. Thus, the rack means 22 on the link 19 will be seen to include two transversely spaced racks 22—23, which may be secured on opposite faces of the link 19 at one side of an elongated slot 28, forming part of guide means to be described. Similarly, the rack means 24 on the lever may comprise transversely spaced racks 24—25; racks 24—25 are preferably carried adjacent the respective racks 22—23 and are, therefore, shown mounted on bifurcated ends of the lever 14. The racks 24—25 are also shown mounted just inside one edge of the slots 30 in the lever 14 and forming guide means to be described. A single elongated pinion may be held in constant engagement with all the described racks 22—23—24—25, but I show in Fig. 3 that the pinion means 26 preferably comprises two spaced pinions fixed to a common shaft 31 so as to form, functionally speaking, a single pinion unit; as shown, the pinion 26 meshes with the link and lever racks 22—24, while the pinion 27 meshes with the link and lever racks 23—25.

In order to hold the pinion means 26 in constant engagement with the racks, both the link 19 and the lever 14 include pivot-guide means which may utilize that elongated face or edge of slots 28—30 which is opposite the edge along which the racks are mounted. In each case, the pivot shaft 31 may directly ride along such guide edges but, for smoother operation, I employ at 32 a slide block guided along the guide edge of slot 28 in link 19 and providing journalling support for the pivot means 26—31. Similarly, slide blocks 33—34 may ride the guide edges of slot 30 in lever 14 and provide journalling support for the pivot means 26—31.

For utmost range of valve-travel adjustment, the pivot means 26 should be adjustably positionable, at least to a point on the pivot axis 13 for actuating lever 14. Therefore, as will be seen more clearly in Figs. 1 and 2, the slots 28—30 (and rack means associated therewith) extend to and slightly beyond the pivot point 13 for the lever 14. In Fig. 3, I show that outer journalling blocks 35 may be fixed to the lever 14 outside the guide means 30, so as not to interfere with movement of slide blocks 33—34 and so as, at the same time, to provide the necessary support for the pivot axis 13 in the frame 12.

In order to effect adjustment of the position of the pivot means 26 with respect to the described racks, an actuating member may be provided directly on the pivot shaft 31. However, this is likely to be inconvenient for smaller cranking radii, which may be so short as to practically coincide with the main-lever axis 13. Therefore, in the form shown, I furnish an adjustable means 36 downwardly offset from the axis of pivot means 26 by an amount sufficient to provide the desired accessibility even for small-lift adjustment. The adjustable means 36 may be a knob journalled at the lower end of the slide block 33 and in driving engagement with a pinion 37; the pinion 37 may be somewhat thinner than either of the pinions 26—27 so as to mesh only with a particular one of the racks 24 or 25, as the case may be. Locking means (not shown) may be provided for securing an adjusted position of the knob 36.

In operation, adjustment may be made with the knob 36 whatever the angular or actuated position of the lever. However, it may be more convenient to make such adjustments when the valve is in the closed position and while the parts are in the relationship shown in Fig. 1. It will be seen that, upon actuating the knob 36, slide block 33 will be raised or lowered along the guide means 30 in lever 14. The same time, the pinion means 26—27 will be driven up or down the racks on both the lever 14 and link 19. At no time will any movement of the valve member be involved when making this adjustment, that is, as long as the lever remains in the down or valve-closed position. Once a desired adjustment has been made, as determined by observing an indicator 38 against a scale 39 (Fig. 3), the slide-block position is fixed, and there is no predominant force tending to move the slide blocks or pinions up or down.

Figure 4:
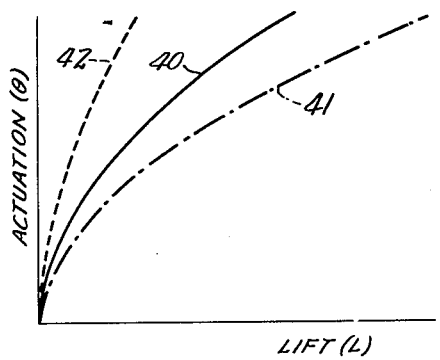
Fig. 4 is a graphical representation of the relationship between actuating-lever movement and valve-member lift, for various selected adjustments available with the mechanism of the Fig. 1.

Upon actuation of the lever 14, as to the position shown in Fig. 2, the cranking radius for lifting the link 19 is effectively determined by the pinion means 26. Because this cranking point 26 is substantially aligned with the valve-stem axis for the valve closed position, initial valve-opening movements will be relatively small for a given lever actuation, and toward the upper end of lever travel, valve-opening movements will be substantially greater. This relationship is clearly seen in Fig. 4, wherein movement of lever 14 is expressed in terms of angular actuation $\theta$, and lift is expressed as a straight-line displacement L. For the adjustment depicted in Figs. 1 to 3, it will be seen that the solid line 40 may characterize the actuation-lift relationship so that for a total lever-actuation movement a particular valve lift of, say, seven units is obtained. If the knob 36 can be adjusted to displace the pivot means 26 downwardly, thereby increasing the cranking radius, the characteristic relationship may be as depicted in the dot-and-dash line 41 and a total valve lift of, say, twelve units may be obtained. For adjustment in the other direction, as to a relatively small cranking radius, a relation shown by the dashed curve 42 may be obtained. In all cases, however, it will be observed that the basic relation remains the same, that is, small valve lifts are obtained for initial lever movements, whereas larger valve lifts are obtained toward the end of the movement.

In Fig. 5, I show a slight modification of the described construction, representing an alternative arrangement for adjusting the pivotal connection 26 between lever 14 and link 19. The same rack-and-pinion engagement may obtain as described in Figs. 1 to 3, but I have shown lead-screw means 50 threaded in the upper end 51 of the connecting link 19 and projecting externally for actuation at 52. The lower end of the lead screw 50 is axially fixed (as by a collar) to a bracket or lug 53 connected to the pivot shaft 31. Thus, the means 53 may be part of the slide block 32 for pinions 26—27. It will be understood that operations will otherwise be as described for Figs. 1 to 3.

In Fig. 6, I illustrate that, where the parts are to be stressed in tension at all times, my invention can be practiced in simplified form by employing cable means 60 as the connecting link between the arm 14' and the valve-stem connecting means 18'. In order to preserve a constant total for the length of the connecting link 60, plus the instantaneous cranking radius about the pivot 13 for lever 14', I illustrate connection of the cable 60 at one end to the valve-stem connecting means 18' and at the other end to an upper point of the lever 14', as at location 61 above the lever pivot 13 and yet aligned with the pivot axis 13 when the valve is in the valve-closed position. Pivot-guide means 62 may be carried by the lever 14' and aligned with the valve actuating axis; the guide means 62 is shown supporting pivot means, such as a slide 63 with set-screw securing means 64, for adjustably positioning same along the guide means 62. The pivot means 65 may be an eye or other means slidably receiving the cable 60. Spring means 66 may sustain the parts in tension and normally urge the valve to closed position.

In operation, the valve-stem connecting means will be lifted with movement of actuating lever 14', in accordance with the adjusted position or cracking radius of eye 65. Since adjustment of the eye or pivot means 65 entails no change in length of the cable, there is no change in valve-stem placement for the zero or closed position of the valve; this is true regardless of the extent of adjustment of pivot or eye 65. Since the pivot-guide axis 62 is aligned with the valve-stem axis for the closed position of the valve, it follows that the smallest valve-opening movements accompany initial lever actuation, while the greatest valve-opening movements are obtained at the upper end of lever travel.

It will be seen that I have described relatively simple mechanism for obtaining the desired objectives. In all cases, a great range of adjustment in total valve lift is available for a given actuating-lever movement. Any adjustment is made in a single operation, without affecting the valve-stem placement for the closed position of the valve. Also, the desired predominantly non-linear relation between actuating-lever movement and valve-stem displacement occurs near the closed position of the valve, rather than predominantly at any other point in the operating range.

While I have described the invention in detail for the preferred forms shown, it will be understoood that modifications may be made within the scope of the invention as defined in the claims which follow.

I claim:

1. In a lever-valve actuating mechanism, frame means, valve-stem connecting means including frame-based guide means on a valve-stem guide axis, an actuating lever pivotally supported on a frame-based axis transverse to said guide axis and generally aligned with said guide axis, pivot-guide means on said actuating lever and generally aligned with said guide axis when said lever is in the position corresponding to valve-closed position of said valve-stem connecting means, pivot means adjustably positionable along said pivot-guide means, and connecting means connecting said pivot means with said valve-stem connecting means.

2. In a lever-valve actuating mechanism, frame means, valve-stem connecting means including frame-based guide means on a valve-stem guide axis, an actuating lever pivotally supported on a frame-based axis transverse to said guide axis and generally aligned with said guide axis, pivot-guide means on said actuating lever and generally aligned with said guide axis when said lever is in the position corresponding to a valve-closed position of said valve-stem connecting means, pivot means adjustably positionable along said pivot-guide means, and variable length connecting means connecting said valve-stem connecting means to an adjustably selectable point along said pivot-guide means.

3. In a lever-valve actuating mechanism, frame means, valve-stem connecting means including frame-based guide means on a valve-stem guide axis, an actuating lever pivotally supported on a frame-based axis transverse to said guide axis and generally aligned with said guide axis, pivot-guide means on said actuating lever and generally aligned with said guide axis when said lever is in the position corresponding to a valve-closed position of said valve-stem connecting means, pivot means adjustably positionable along said pivot-guide means, variable-length connecting means connecting said pivot means with said valve-stem connecting means, and means restricting the length of said connecting means to a magnitude such that, for any one adjustment of said pivot means along said pivot-guide means, the length of said connecting means plus the radial separation of said pivot means from the pivotal support for said actuating lever is substantially a constant.

4. An actuating mechanism according to claim 3, in which said connecting means includes flexible-cable means connected at one end to said valve-stem connecting means and at the other end substantially at the pivot point for said actuating lever, and in which said adjustable pivot means is freely slidable with respect to said cable means.

5. An actuating mechanism according to claim 3, in which said variable-length connecting means includes a first rack on said lever along said pivot-guide means and a second rack connected to said valve-stem connecting means, and in which said pivot means includes pinion means meshing simultaneously with both said racks.

6. In a lever-valve actuating mechanism, frame means, valve-stem connecting means including frame-based guide means on a valve-stem guide axis, an actuating lever pivotally supported on a frame-based axis transverse to said guide axis and generally aligned with said guide axis, rack means on said actuating lever and generally aligned with said guide axis when said lever is in the position corresponding to a valve-closed position of said valve-stem connecting means, connecting means including rack means longitudinallly overlapping said first rack means when said lever is in said valve-closed position and connected at one end with said valve-stem connecting means, and pinion means meshing in common with both said racks.

7. An actuating mechanism according to claim 6, in which each of said racks include guide means having in each case a guide axis parallel to the predominant rack axis, and means slidable along side guide means and holding said pinion means in common meshing engagement with said both rack means.

8. An actuating mechanism according to claim 7, in which said last-defined means includes a slide block on the guide means on said lever, said pinion being journalled in said slide block.

9. An actuating mechanism according to claim 7, in which said last-defined means includes a slide block on the guide means on said connecting means, said pinion being journalled in said slide block.

10. In a lever-valve actuating mechanism, frame means, valve-stem connecting means including frame-based guide means on a valve-stem guide axis, an actuating lever pivotally supported on a frame-based axis transverse to said guide axis and generally aligned with said guide axis, pivot-guide means on said actuating lever and generally aligned with said guide axis when said lever is in the position corresponding to a valve-closed position of said valve-stem connecting means, connecting means connected at one end to said valve-stem connecting means and including at the other end pivot-guide means generally aligned with said guide axis when said lever is in said valve-closed position, and pivot means connecting said connecting means to said lever and slidably guided along both said pivot-guide means.

11. An actuating mechanism according to claim 10, in which said pivot means include a slide block guided by one of said pivot-guide means, and selectively adjustable positioning means for positioning said slide block along said one pivot-guide means.

12. An actuating mechanism according to claim 11, in which said positioning means includes a lead screw and means for actuating same.

13. An actuating mechanism according to claim 11, in which said one guide means includes rack means therealong, and in which said positioning means includes a pinion engaging said rack means and manual means for actuating said pinion.

14. An actuating mechanism according to claim 13, in which racks are provided alongside the pivot-guide means of both said lever and said connecting means, and in which said pivot means includes pinion means meshing in common with both said racks.

15. In a lever-valve actuating mechanism, frame means, valve-stem connecting means including frame based guide means on a valve-stem guide axis, an actuating lever pivotally supported on a pivot axis transverse to said guide axis and generally aligned with said guide axis, pivot-guide means on said actuating lever and generally aligned with said guide axis when said lever is in the position corresponding to a valve-closed position of said valve-stem connecting means, two transversely spaced longitudinally overlapping racks on said actuating lever and generally aligned with said guide axis when said lever is in said valve-closed position, connecting means connected at one end to said valve-stem connecting means and including at the other end rack means transversely symmetrically placed with respect to said spaced racks on said lever, and pinion means meshing in common with said racks and adjustable along said pivot-guide means.

16. In a lever-valve actuating mechanism, frame means, valve-stem connecting means including frame-based guide means on a valve-stem guide axis, an actuating lever pivotally supported on pivot axis transverse to said guide axis and generally aligned with said guide axis, pivot-guide means on said actuating lever and generally aligned with said guide axis when said lever is in the position carresponding to a valve-closed position of said valve-stem connecting means, connecting means connected at one end to said valve-stem connecting means and including at the other end two transversely spaced longitudinally overlapping racks, rack means on said actuating lever and generally aligned with said guide axis when said lever is in said valve-closed position and transversely symmetrically placed with respect to said spaced racks, and pinion means meshing in common with said racks and adjustable along said pivot-guide means.

17. An actuating mechanism according to claim 16, in which said pinion means comprises like pinions spaced transversely on a common axis, and slide-block means between said pinions and providing journalling support for said pinions and slidable along said pivot-guide means.

18. In a lever-valve actuating mechanism, frame means, valve-stem connecting means constrained for limited movement with reference to said frame means, whereby a connecting point on said connecting means may have a defined path of movement, an actuating lever pivotally supported on a frame-based axis transverse to said path and generally aligned with said path, pivot-guide means on said actuating lever and generally aligned with said path when said lever is in the position corresponding to a valve-closed position of said valve-stem connecting means, pivot means adjustably positionable along said pivot-guide means, and variable length connecting means connecting said connecting point to an adjustably selectable point along said pivot-guide means.

References Cited in the file of this patent

UNITED STATES PATENTS

| Number | Name | Date |
|---|---|---|
| 273,276 | Hawkinson | Mar. 6, 1883 |
| 436,276 | Van Depoele | Sept. 9, 1890 |
| 586,563 | Parsons | July 20, 1897 |
| 1,271,568 | Hall | July 9, 1918 |
| 2,022,511 | Lewis | Nov. 26, 1935 |
| 2,197,730 | Mugford | Apr. 16, 1940 |